US009429815B2

(12) United States Patent
Takahashi et al.

(10) Patent No.: US 9,429,815 B2
(45) Date of Patent: Aug. 30, 2016

(54) BLADE DRIVE DEVICE AND OPTICAL INSTRUMENT

(71) Applicant: SEIKO PRECISION INC., Narashino-shi (JP)

(72) Inventors: Hiroshi Takahashi, Narashino (JP); Shoichi Tokura, Narashino (JP); Chiaki Nemoto, Narashino (JP); Yoichi Nakano, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 14/528,223

(22) Filed: Oct. 30, 2014

(65) Prior Publication Data

US 2015/0050014 A1  Feb. 19, 2015

Related U.S. Application Data

(63) Continuation of application No. PCT/JP2013/072450, filed on Aug. 22, 2013.

(30) Foreign Application Priority Data

Sep. 24, 2012 (JP) .................. 2012-210079
May 27, 2013 (JP) .................. 2013-111175

(51) Int. Cl.
*G03B 9/08* (2006.01)
*G03B 9/42* (2006.01)
*G03B 9/36* (2006.01)

(52) U.S. Cl.
CPC .. *G03B 9/42* (2013.01); *G03B 9/36* (2013.01)

(58) Field of Classification Search
CPC ................... G03B 9/42; G03B 9/36

USPC ........................................ 396/469
See application file for complete search history.

(56) References Cited

U.S. PATENT DOCUMENTS 4,373,797 A * 2/1983 Shimada et al. ............. 396/469
5,333,025 A * 7/1994 Dowe .......................... 396/469
(Continued)

FOREIGN PATENT DOCUMENTS

JP  2001-281730 A1  10/2001
JP  2004-317666 A1  11/2004
(Continued)

OTHER PUBLICATIONS

International Search Report for International Application No. PCT/JP2013/072450 dated Oct. 1, 2013.
(Continued)

*Primary Examiner* — David Gray
*Assistant Examiner* — Dennis Hancock
(74) *Attorney, Agent, or Firm* — Kratz, Quintos & Hanson, LLP

(57) ABSTRACT

A blade drive device includes: a board including an opening; first and second blades opening and closing the opening; and first and second actuators respectively driving the first and second blades, wherein the first and second actuators respectively include first and second stators, first and second rotors, and first and second coils, and respectively drive the first and second blades through first and second drive members, the first drive member is arranged to overlap the first stator and the first coil in an optical axis direction, and the second drive member is arranged to overlap the second stator and the second coil in the optical axis direction.

9 Claims, 11 Drawing Sheets

(56) References Cited

U.S. PATENT DOCUMENTS

| | | |
|---|---|---|
| 2004/0223756 A1 | 11/2004 | Nakano |
| 2006/0056840 A1 | 3/2006 | Usuda |
| 2011/0158635 A1 | 6/2011 | Hwang |
| 2013/0322866 A1* | 12/2013 | Suzuki .................... G03B 9/10 396/493 |

FOREIGN PATENT DOCUMENTS

| | | | |
|---|---|---|---|
| JP | 2005-304221 A1 | 10/2005 | |
| JP | 2006-84826 A1 | 3/2006 | |
| JP | 2009-175365 A1 | 8/2009 | |
| JP | 2010-85436 A1 | 4/2010 | |
| JP | WO 2012132109 A1 * | 10/2012 | ............... G03B 9/10 |
| KR | 10-2011-0079225 A | 7/2011 | |
| WO | WO 2012/120735 A1 | 9/2012 | |

OTHER PUBLICATIONS

Office Action of corresponding Japanese Patent Application No. 2013-111175 dated May 10, 2016, with English translation.
Office Action issued in corresponding Korean Patent Application No. 10-2014-7029504, with English translation.

* cited by examiner

BLADE DRIVE DEVICE AND OPTICAL INSTRUMENT

CROSS-REFERENCE TO RELATED APPLICATION

This application is a continuation of and claims priority to International Patent Application No. PCT/JP2013/072450 filed on Aug. 22, 2013, which claims priority to Japanese Patent Application No. 2012-210079 filed on Sep. 24, 2012 and Japanese Patent Application No. 2013-111175 filed on May 27, 2013, subject matter of these patent documents is incorporated by reference herein in its entirety.

BACKGROUND (i) Technical Field

The present invention relates to blade drive devices and optical instruments.

(ii) Related Art

Japanese Unexamined Patent Application Publication No. 2009-175365 discloses a blade drive device in which an actuator drives a blade to open and close an opening in a board. The actuator is connected with a drive lever for driving the blade. The actuator and the drive lever are supported on the board.

The positional relationship between the actuator and the drive lever might increase the space on the board occupied by these members. This might increase the size of the board in the planar direction perpendicular to an optical axis direction, so that the size of the blade drive device itself might be increased.

SUMMARY

It is thus object of the present invention to provide a blade drive device having a reduced size in a planar direction perpendicular to an optical axis direction and an optical instrument having the same.

According to an aspect of the present invention, there is provided a blade drive device including: a board including an opening; first and second blades opening and closing the opening; and first and second actuators respectively driving the first and second blades, wherein the first and second actuators respectively include first and second stators, first and second rotors, and first and second coils, and respectively drive the first and second blades through first and second drive members, the first drive member is arranged to overlap the first stator and the first coil in an optical axis direction, and the second drive member is arranged to overlap the second stator and the second coil in the optical axis direction.

DETAILED DESCRIPTION

Figure 1:
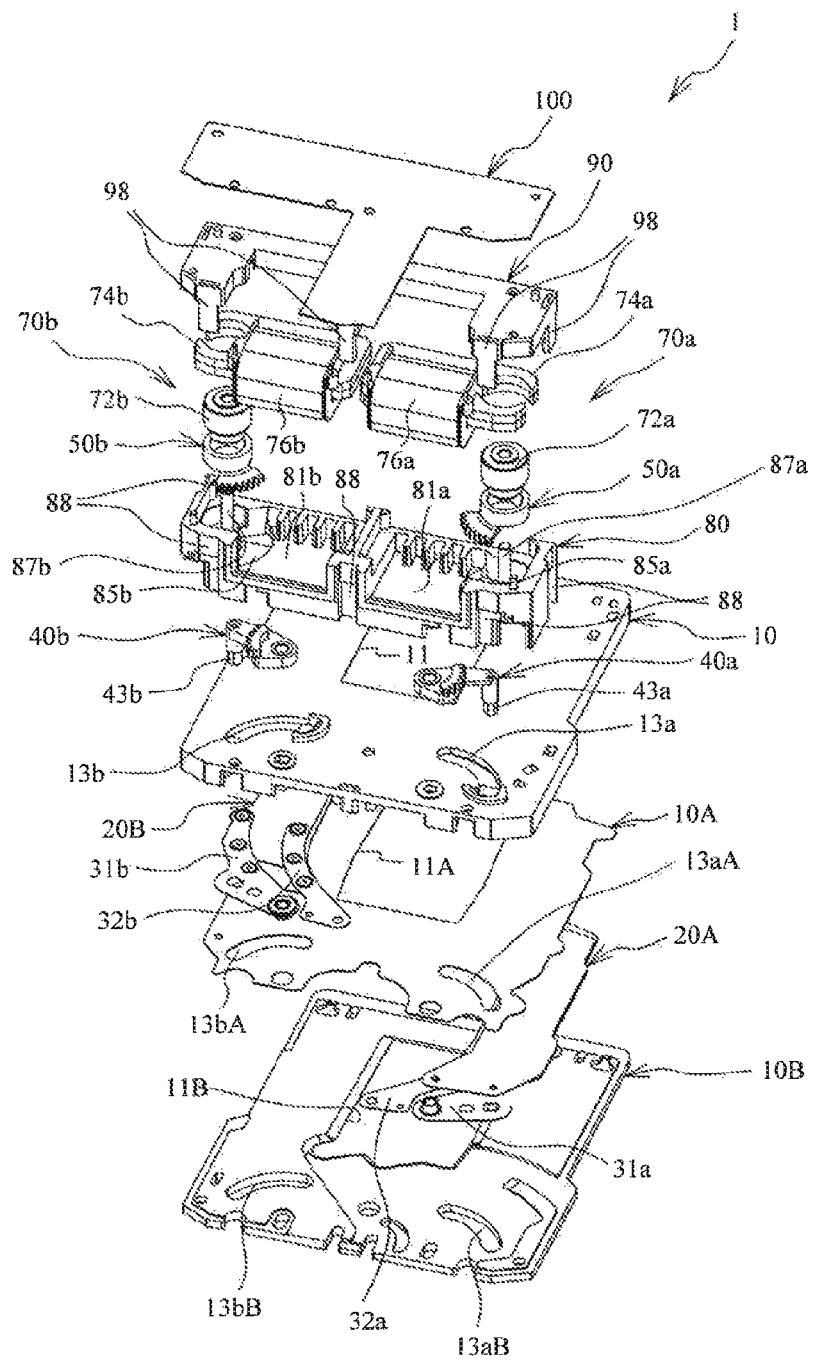
FIG. 1 is an exploded perspective view of a blade drive device according to the present embodiment.
Figure 2:
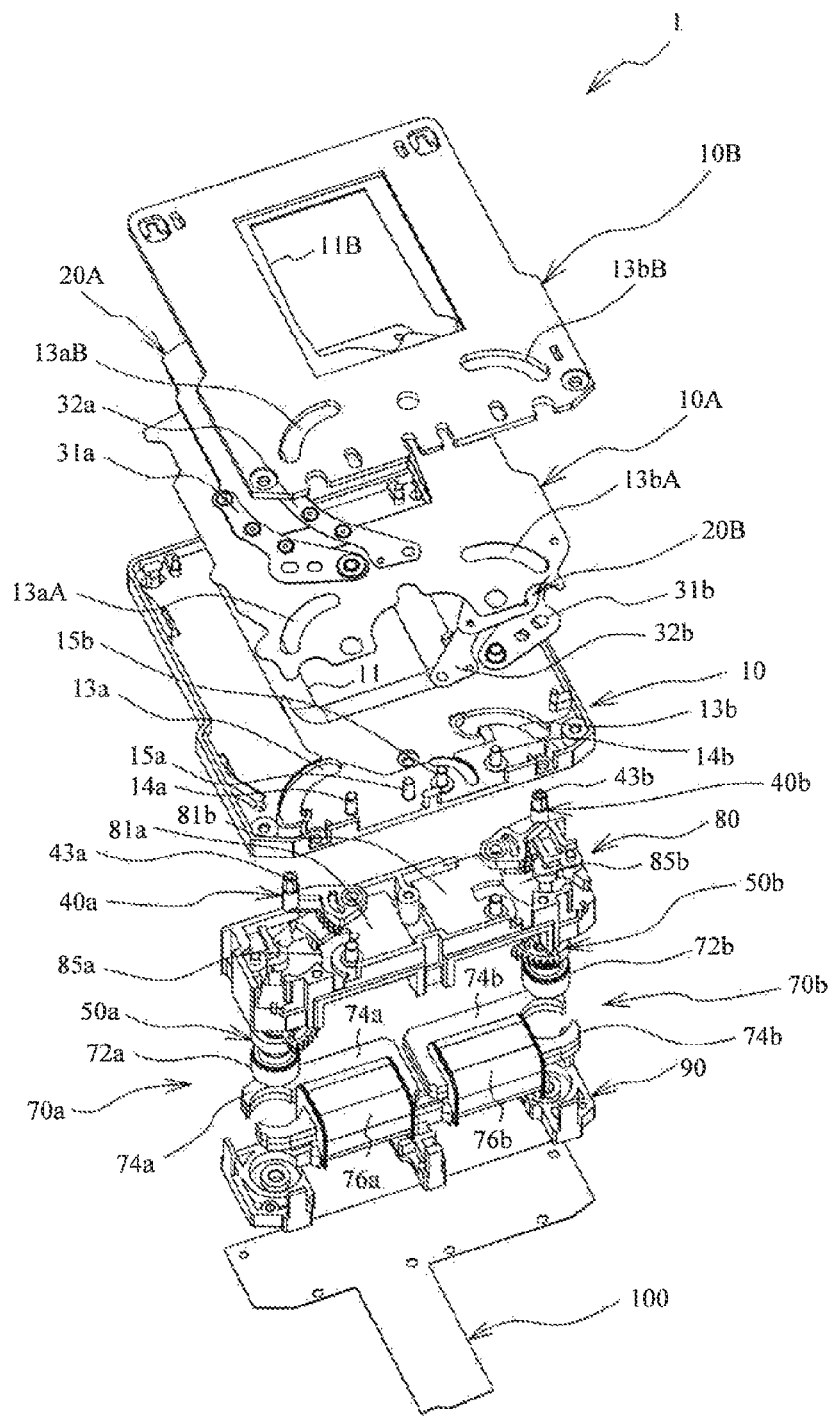
FIG. 2 is an exploded perspective view of the blade drive device according to the present embodiment.

FIGS. 1 and 2 are exploded perspective views of a blade drive device 1 according to the present embodiment. The blade drive device 1 is also referred to as a focal plane shutter. The blade drive device 1 is employed in an optical instrument such as a digital camera or a still camera. The blade drive device 1 includes boards 10, 10A, and 10B, a leading blade 20A, a trailing blade 20B, arms 31a, 32a, 31b, and 32b, and actuators 70a and 70b. The boards 10, 10A, and 10B respectively include openings 11, 11A, and 11B. The leading blade 20A and the trailing blade 20B open and close these openings 11, 11A, and 11B. The actuators 70A and 70B drive the leading blade 20A and the trailing blade 20B, respectively.

The leading blade 20A and the trailing blade 20B each includes plural blades. Each of the leading blade 20A and the trailing blade 20B can shift between an overlapped state where the plural blades overlap one another and an expanded state where the plural blades are expanded. These plural blades in the overlapped state recede from the opening 11 to cause the opening 11 to be in a fully opened state. These plural blades in the expanded state close the opening 11 to cause the opening 11 to be in a fully closed state. FIGS. 1 and 2 illustrate the blade drive device 1 in the fully opened state.

The leading blade 20A is connected with the arms 31a and 32a. The trailing blade 20B is connected with the arms 31b and 32b. As illustrated in FIG. 2, the arms 31a, 32a, 31b, and 32b are rotatably supported by spindles 14a, 15a, 14b, and 15b provided in the board 10, respectively.

Drive members 40a and 40b drive the arms 31a and 31b, respectively. Thus, the arms 31a and 31b correspond to driven members that are driven by the drive members 40a and 40b and that drive the leading blade 20A and the trailing blade 20B, respectively. The drive members 40a and 40b are provided with drive pins 43a and 13b connected with the arms 31a and 31b, respectively. The boards 10, 10A, and 10B are respectively formed with escape slots 13a, 13aA, and 13aB for permit-ting the movement of the drive pin 43a. Likewise, they are respectively formed with escape slots 13b, 13bA, and 13bB for permitting the movement of the drive pin 43b. The drive members 40a and 40b will be described later in detail.

The board 10 is assembled with holders 80 and 90 holding the actuators 70a and 70b. The holder 80 is formed with support walls 81a and 81b that respectively support the actuators 70a and 70b. The holder 80 is secured on the hoard 10. The holders 80 and 90 are secured to each other. The holder 90 is provided with plural engaging claws 98. The holder 80 is provided with plural engaging portions 88 which are respectively engaged with the engaging claws 98. The holders 30 and 90 are secured to each other by engaging the engaging claws 98 with the engaging portions 88. The holders 80 and 90 are made of a synthetic resin.

The actuator 70a includes: a rotor 72a rotatably supported by the holder 80; a stator 74a excited to generate magnetic force between the stator and the rotor 72a; and a leading blade coil 76a for exciting the stator 74a. The rotor 72a is fitted with an output member 50a as will be described later in detail. The output member 50a is connected with the drive member 40a. Therefore, the rotation of the rotor 72a drives the output member 50a and the drive member 40a to drive the arm. 31a and the leading blade 20A. The actuator 70b has the same arrangement, The rotation of a rotor 72b of the actuator 70b drives the drive member 40b to drive the trailing blade 20B.

The support walls 81a and 81b of the holder 80 are respectively formed with escape holes 85a and 85b. The escape hole 85a receives a connection portion where the drive member 40a and the output member 50a are connected with each other. Likewise, the escape hole 85b receives a connection portion where the drive member 40b and an output member 50b are connected with each other. The holder 80 is formed with spindle portions 87a and 87b for supporting the rotors 72a and 72b for rotation, respectively. A printed circuit. board 100 is secured on an upper portion of the holder 90. The printed circuit board 100 supplies the coils 76a and 76b with power.

Figure 3:
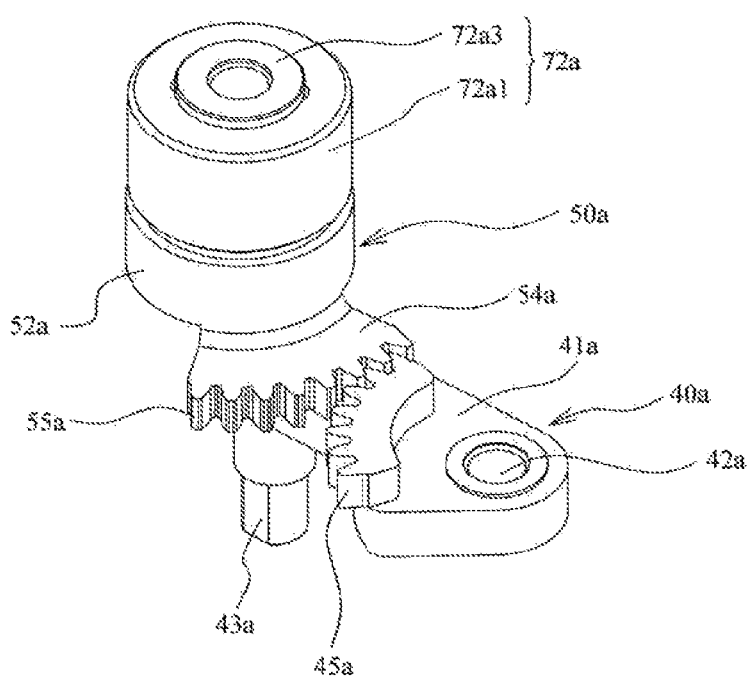
FIG. 3 is an enlarged view of a rotor, a drive member, and an output member.

FIG. 3 is an enlarged view of the rotor 72a, the drive member 40a, and the output member 50a. Additionally, FIG. 3 illustrates a state where the rotor 72a, the drive member 40a, and the output member 50a are assembled into the blade drive device 1. The drive member 40a includes: an arm portion 41a having a plate shape; a support hole 42a formed at one end of the arm portion 41a and serving as a fulcrum of rotation; and the drive pin 43a formed at the other end of the arm portion 41a and extending in a predetermined direction. Also, a gear portion 45a is formed on the upper portion of the arm portion 41a. The rotor 72a includes a cylindrical portion 72a3, and a permanent magnet 72a1 having a ring shape and fitted with the cylindrical portion 72a3. The permanent magnet 72a1 is energized to have different polarities in the circumferential direction. The permanent magnet 72a1 is fitted with the upper side of the cylindrical portion 72a3 and is not rotated relative thereto. The output member 50a is fitted with the lower side of the cylindrical portion 72a3 and is not rotated relative thereto. Thus, the output member 50a rotates together with the rotor 72a. The permanent magnet 72a1 and the cylindrical portion 72a3 are integrally formed with each other.

The output member 50a includes: a cylindrical portion 52a having a substantially cylindrical shape and fitted with the cylindrical portion 72a3; a projection portion 54a projecting from the cylindrical portion 52a in the radially outward direction; and a gear portion 55a formed at one end of the projection portion 54a. The gear portion 55a of the output member 50a meshes with the gear portion 45a of the drive member 40a. Thus, the force of the output member 50a is transmitted to the drive member 40a. Therefore, the gear portion 45a of the drive member 40a corresponds to a first connection portion connected with the output member 50a.

Figure 4:
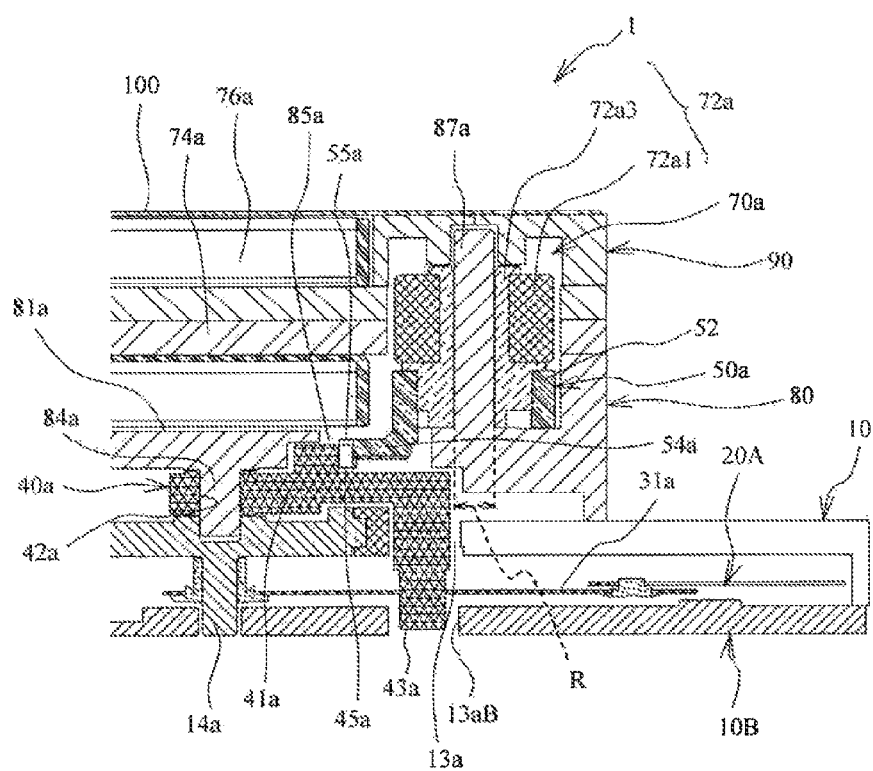
FIG. 4 is a sectional view around a leading blade, the drive member, the output member, and an actuator.

FIG. 4 is a sectional view around the leading blade 20A, the drive member 40a, the output member 50a, and the actuator 70a. Additionally, FIG. 4 is the sectional view of the blade drive device 1 viewed in the direction perpendicular to the axial direction of the opening 11. The board 10A is omitted in FIG. 4. The support hole 42a of the drive member 40a is rotatably fitted onto a spindle 84a of the holder 80. Accordingly, the drive member 40a is rotatably supported. Thus, the support hole 42a corresponds to a support portion that rotatably supports the drive member 40a. The drive pin 43a extends in a predetermined direction and is connected with the arm 31a arranged between the boards 10 and 10B. Thus, the drive pin 43a of the drive member 40a corresponds to a second connection portion connected with the arm 31a. As mentioned above, the arm 31a is connected with the leading blade 20A. The connection between the output member 50a and the drive member 40a is ensured through the escape hole 85a. Specifically, the gear portions 45a and 55a are positioned in the escape hole 85a.

Also, as illustrated in FIGS. 3 and 4, the gear portion 45a of the drive member 40a is positioned between the support hole 42a and the drive pin 43a. Therefore, the load applied to the spindle 84a fitted into the support hole 42a can be reduced, thereby making the diameter of the spindle 84a smaller than conventional one. A following description will be given of the load exerted on the drive member 40a.

Figure 5A:
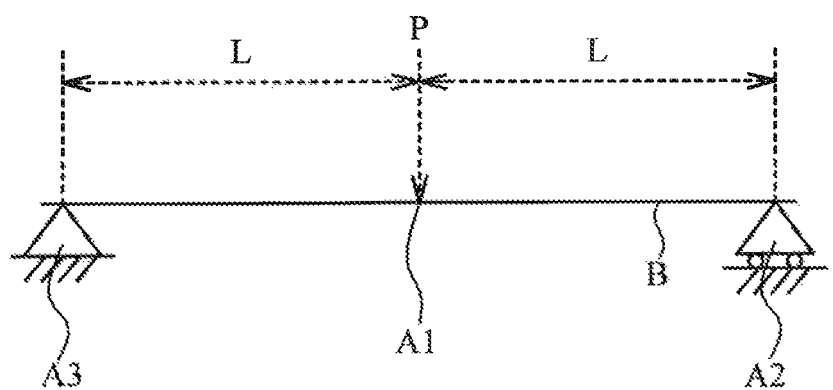
FIGS. 5A and 5B are explanatory views of load applied to the drive member.
Figure 5B:
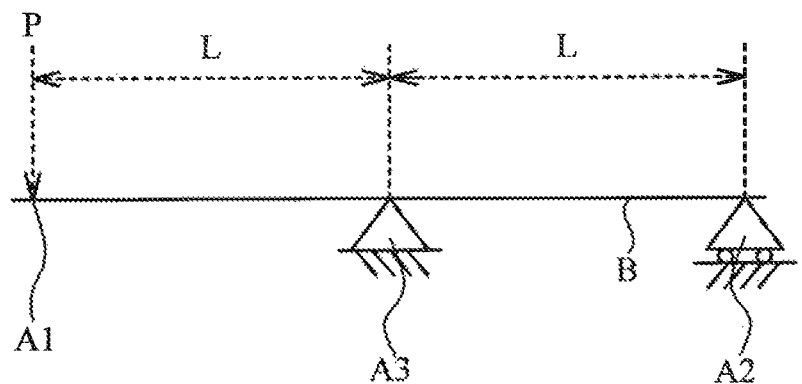

FIGS. 5A and 5B are explanatory views of the load exerted on the drive member 40a. FIG. 5A is the explanatory view of the load exerted on the drive member 40a in the present embodiment, and FIG. 5B is the explanatory view of the load exerted on a drive member having a structure different from the present embodiment. In the present embodiment, the arm portion 41a of the drive member 40a is formed with the drive pin 43a fitted into the arm 31a, and the support hole 42a fitted with the spindle 84a. Thus, the arm portion 41a of the drive member 40a can be considered as a both-end-supported beam B that is supported at points A2 and A3, as illustrated in FIG. 5A. The point A3 corresponds to the support hole 42a. The point A2 corresponds to the second connection portion where the arm 31a is connected with the drive member 40a. Herein, it can be considered that the gear portion 45a formed on the arm portion 41a to which the force is transmitted from the output member 50a is a load P exerted on the beam B. The length of the beam B is represented by 21. A point A1 where the load P is exerted is considered as the center of the beam B. The point A1 corresponds to the first connection portion where the drive member 40a and the output member 50a are connected with each other. In this case, the magnitude of the shear stress in the point A3 is P/2. The magnitude of the bending moment in the point A3 is zero.

In contrast, in FIG. 5B, the point A1 where the load is exerted is positioned outside the point A3, and the point A3 is positioned between the points A1 and A2. That is, FIG. 5B illustrates a conventional structure where the support hole 42a of the present embodiment is positioned between the gear portion 45a and the drive pin 43a of the drive member 40a. As mentioned above, the point A3 means the fulcrum where the drive member 40a is rotatably supported. Therefore, a part of the beam B between the points A1 and A3 can be considered as a cantilever beam that is supported at the point A3. The magnitude of the shear stress exerted on the point A3 is P. The magnitude of the bending moment exerted on the point A1 is PL. Thus, the shear stress and the bending moment exerted on the point A3 of the beam B illustrated in FIG. 5A are smaller than those of the beam B illustrated in FIG. 5B, respectively.

Thus, in the present embodiment, the large load is not applied to the spindle 84a that rotatably fits into the support hole 42a of the drive member 40a. Accordingly, it is possible to make the diameter of the spindle 84a smaller than that of the conventional structure where the support hole 42a is arranged between the gear portion 45a and the drive pin 43a. This reduces the size of the blade drive device 1 in the planar direction.

Also, as illustrated in FIG. 4, the gear portion 45a of the drive member 40a and the gear portion 55a of the output member 50a are positioned in the escape hole 85a of the holder 80. This reduces the thickness of the blade drive device 1.

Also, the size of the escape hole 85a is set so as to permit the connection between the gear portions 45a and 55a. Thus, the escape hole 85a is comparatively large. This reduces the weight of the holder 80.

Also, the gear portions 45a and 55a are connected with each other in the escape hole 85a, thereby arranging the drive member 40a and the output member 50a close to each other. This reduces the whole size of the drive member 40a and the output member 50a. Further, this reduces the total weight of the drive member 40a and the output member 50a. Thus, the blade drive device 1 is reduced in weight.

Figure 6:
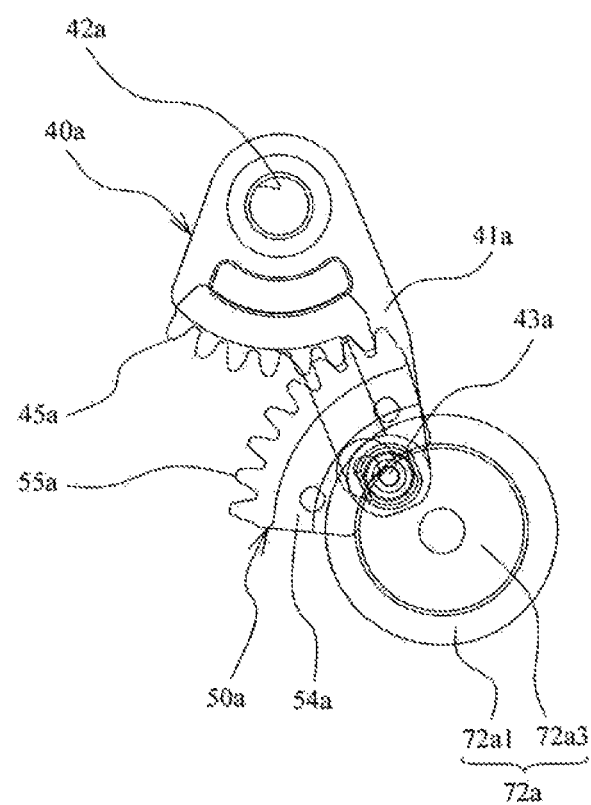
FIG. 6 is a perspective view of the drive member, the output member, and the rotor when viewed in an axial direction of an opening.

FIG. 6 is a perspective view of the drive member 40a, the output member 50a, and the rotor 72a when viewed in the axial direction of the opening 11. In other words, FIG. 6 is the perspective view of the drive member 40a, the output member 50a, and the rotor 72a when viewed in the axial direction of the rotor 72a. As illustrated in FIG. 6, the drive pin 43a overlaps the rotor 72a. Specifically, a part of a trajectory of the drive pin 43a overlaps the rotor 72a. The rotor 72a and the drive member 40a are arranged in such a manner, thereby reducing the size of the blade drive device 1 in the planar direction. Additionally, as illustrated in FIG. 6, the gear portion 45a is arranged on a straight line that connects between the center of the support hole 42a and the center of the drive pin 43a.

Figure 7:
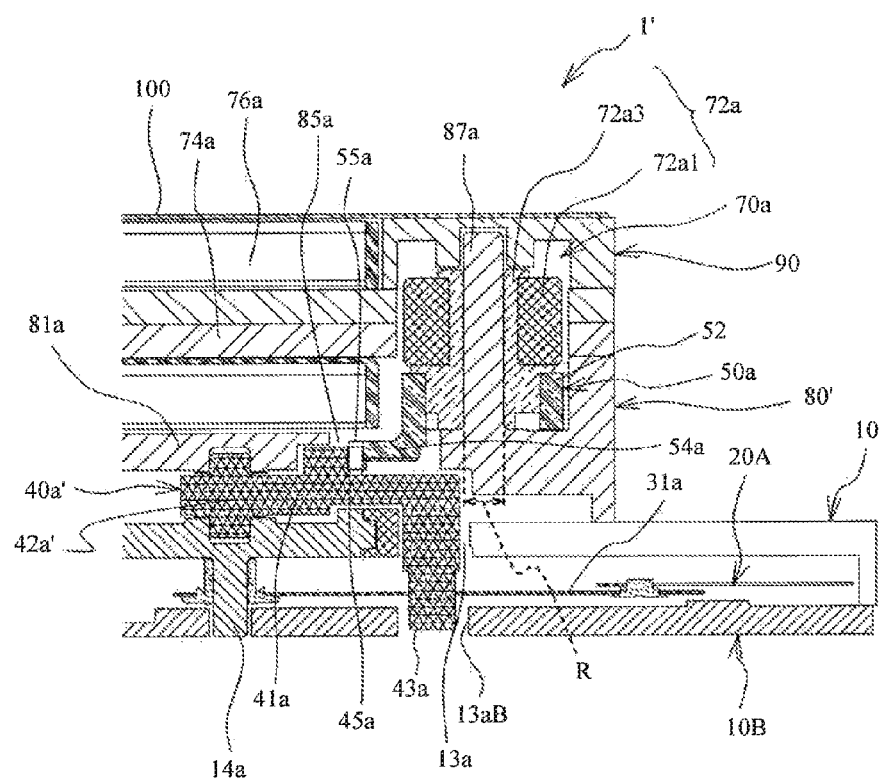
FIG. 7 is a sectional view of a blade drive device according to a variation.

FIG. 7 is a sectional view of a blade drive device 1' according to a variation. FIG. 7 corresponds to FIG. 4. A drive member 40a' includes a support spindle 42a'. The support spindle 12a' is rotatably fitted within each hole formed in a holder 80' and the board 10. Thus, the support spindle 42a' corresponds to a support portion that rotatably supports the drive member 40a. In such a manner, the drive member 40a' may be rotated by the support spindle 42a'. In such a configuration, the load exerted on the support spindle 42a' is small. It is thus possible to make the size of the diameter of the support spindle 42a' small, thereby reducing the size or the blade drive device 1'.

In the embodiment according to the present invention, the blade drive device 1 has been descried as the focal plane shutter. The focal plane shutter according to the present invention is not a type for using springs as drive sources of the leading blade 20A and the trailing blade 20B, but a type for using the electromagnetic actuators 70a and 70b. In a general focal plane shutter, the space, in which a blade drive mechanism for driving the leading blade and the trailing blade can be configured, is limited to a region near one of the short sides of the opening 11 on the board 10 in the present embodiment, that is, a region defined by the holders 80 and 90 on the board 10.

In a case of the focal plane shutter equipped with the leading blade and the trailing blade driven by the electromagnetic actuators 70a and 70b, in order to ensure high speed in these days, the space might be needed for a coil. Thus, the blade drive mechanism might be increased in size. In the focal plane shutter according to the present embodiment, the gear portion 45a of the drive member 40a is positioned between the support hole 42a and the drive pin 43a, and the large load is not applied to the spindle 84a. This can make the diameter of the spindle 84a small. Also, the trajectory of the drive pin 43a partially overlaps the rotor 72a, thereby reducing the size of the blade drive mechanism in the planar direction. Further, the gear portion 45a of the driving member 40a and the gear portion 55a of the output member 50a are arranged in the escape hole 85a, whereby the thickness of the blade drive mechanism can be reduced in thickness direction, that is, in the direction of the spindle 84a. Thus, in the focal plane shutter of the blade drive device 1 according to the present invention, the thickness thereof is reduced in the optical axis direction parallel to the spindle 84a, and the size is reduced in the direction perpendicular to the optical axis direction.

Figure 8:
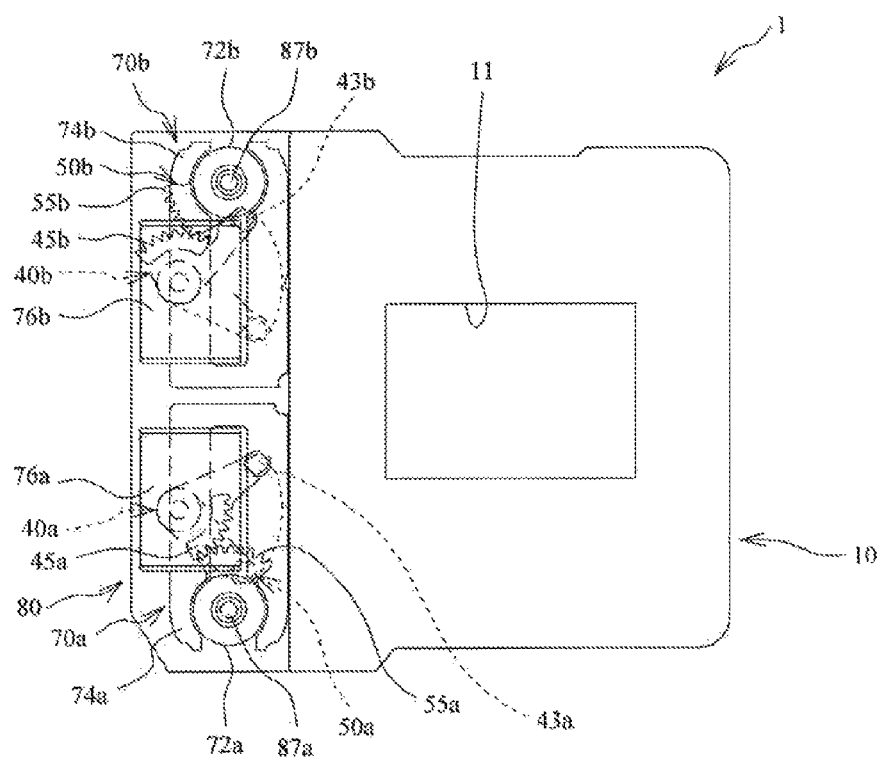
FIG. 8 is a front view of the blade drive device.

Next, the arrangements of the actuators 70a and 70b in the blade drive device 1 will be described. FIG. 8 is a front view of the blade drive device 1. Additionally, parts are omitted in FIG. 8. As illustrated in FIG. 8, the rotors 72a and 72b are arranged to sandwich the coils 76a and 76b. In other words, the rotors 72a and 72b are respectively located at both ends of the holder 80 in the movable direction. of the leading blade 20A and the trailing blade 20B. In such a way, although the actuators 70a and 70b are adjacent to each other, the rotors 72a and 72b are spaced apart from each other. This prevents the rotors 72a and 72b from magnetically influencing each other and from influencing the driving properties of the rotors 72a and 72b. It is therefore possible to ensure the desired driving properties of the leading blade 20A and the trailing blade 20B. Herein, the leading blade 20A and the trailing blade 20B are an example of first and second blades. The actuators 70a and 70b are an example of first and second actuators. The rotors 72a and 72b are an example of first and second rotors. The coils 76a and 76b are an example of first and second coils.

For example, the exposure operation is performed as follows. In the state where the leading blade 20A closes the opening 11 and the trailing blade 20B recedes from the opening 11 and the rotors 72a and 72b stop, the rotor 72a starts rotating and the leading blade 20A moves away from the opening 11 to open the opening 11. After that, the rotor 72b starts rotating and the trailing blade 20B closes the opening 11. In this manner, the timing when the rotor 72a starts rotating is different from the timing when the rotor 72b starts rotating in the exposure operation. Therefore, for example, there is a state where one of the rotors 72a and 72b is rotating and the other stops. Thus, in a case where the two rotors 72a and 72b are adjacent to each other, the rotation of one of the rotors 72a and 72b might change the magnetic field to influence the other of the rotors 72a and 72b. Specifically, the change in the magnetic field of the rotor 72a that firstly starts rotating might cause variations in the timing when the rotor 72b starts rotating. This might cause variations in the period from the time when the leading blade 20A starts opening the opening 11 to the time when the trailing blade 20B fully closes the opening 11, that is, in the exposure period. However, in the present embodiment as mentioned above, the rotors 72a and 72b are not adjacent to each other, whereby the driving properties of the rotors 72a and 72b are prevented from being influenced.

Additionally, the actuators 70a and 70b are arranged such the longitudinal directions thereof are the same as the movable direction of the leading blade 20A and the trailing blade 20B. Further, the actuators 70a and 70b are arranged in the longitudinal direction. Furthermore, the rotors 72a and 72b are respectively arranged at both ends of the whole region of the actuators 70a and 70b in its longitudinal direction. It is therefore possible to further ensure the interval between the rotors 72a and 72b. This prevents the rotors 72a and 72b from magnetically influencing each other and from influencing the driving properties of the rotors 72a and 72b.

Also, FIG. 8 illustrates the rotational ranges of the drive members 40a and 40b. Herein, when the blade drive device 1 is viewed in the direction of the optical axis passing through the opening 11, at least part of the drive member 40*a* and at least part of the output member 50*a* overlap the stator 74*a* or the coil 76*a*. Likewise, at least part of the drive member 40*b* and at least part of the output member 50*b* overlap the stator 74*b* or the coil 76*b*. Therefore, the coils 76*a* and 76*b* each having a large size can be employed. Likewise, the stators 74*a* and 74*b* each having a large size can be employed. Accordingly, the torque and the speed of the rotors 72*a* and 72*b* can be improved. Thus, the movement speed of the leading blade 20A and the trailing blade 20B can be improved, so the shutter speed can be improved. Additionally, at least part of the drive member 40*a* or at least part of the output member 50*a* may protrudes from at least part of the stator 74*a* and the coil 76*a*. Likewise, at least part of the drive member 40*b* or at least part of the output member 50*b* may protrudes from at least part of the stator 74*b* and the coil 76*b*. Herein, the output members 50*a* and 50*b* are an example of first and second output members. The drive members 40*a* and 40*b* are an example of first and second drive members. The stators 74*a* and 74*b* are an example of first and second stators.

Additionally, as illustrated in FIGS. 4, 7, and 8, when the blade drive devices 1 and 1' are viewed in the direction of the optical path passing through the opening 11, the rotational ranges of the drive members 40*a* and 40*a*' are set not to overlap a region R beneath the spindle portion 87*a*. Likewise, the rotational range of the drive member 40*b* is set not to overlap a region beneath the spindle portion 87*b*. This can ensure the thicknesses of portions of the holder 80 supporting roots of the spindle portions 87*a* and 87*b* that respectively support the rotors 72*a* and 72*b* for rotation. This makes it possible to ensure the rigidity of the root portions of the spindle portions 87*a* and 87*b*, thereby supporting the rotors 72*a* and 72*b* in a stable manner.

Further, the ratio of the gear portion 45*a* to the gear portion 55*a* is set such that the rotational speed of the drive member 40*a* is greater than that of the output member 50*a*. That is, the pitch diameter of the gear portion 45*a* is larger than that of the gear portion 55*a*. Likewise, the ratio of the gear portion 45*b* to the gear portion 55*b* is set such that the rotational speed of the drive member 40*b* is greater than that of the output member 50*b*. Therefore, the drive members 40*a* and 40*b* can be respectively rotated much faster than the rotors 72*a* and 72*b*, thereby improving the movement speed of the leading blade 20A and the trailing blade 20B. This also improves the shutter speed.

Further, as mentioned above, the drive force of the actuator 70*a* is transmitted to the leading blade 20A through the gear portions 45*a* and 55*a*. There is backlash between the gear portions 45*a* and 55*a* in order to facilitate the rotation thereof. That is, a certain clearance between the gear portions 45*a* and 55*a* is ensured. The drive member 40*a* rotates and the drive pin 43*a* abuts the end portion of the escape slot 13*a* and the like, so the leading blade 20A stops. When the leading blade 20A stops, the impact is applied to the drive member 40*a*. This impact can be absorbed by the backlash provided between the gear portions 45*a* and 55*a*. It is therefore possible to reduce the load on the drive member 40*a* and the output member 50*a*. It is also possible to prevent the bound of the drive member 40*a* when the drive member 40*a* abuts the end portion of the escape slot 13*a* or the like. This prevents the leading blade 20A receding from the opening 11 from moving toward the opening 11 again due to the bound of the drive member 40*a*. The drive member 40*b*, the output member 50*b*, and the trailing blade 20B have the same arrangement. Herein, the gear portions 55*a* and 55*b* are respective examples of first and second output teeth portions. The gear portions 45*a* and 45*b* are respective examples of first and second following teeth portions.

Additionally, the output members 50*a* and 50*b* are integrally formed with the rotors 72*a* and 72*b*, respectively. For example, laser welding is used, but other welding or insert molding may be used. Further, the rotor 72*a* and the output member 50*a* may be integrally made of a resin mixed with magnetic powder.

Figure 9:
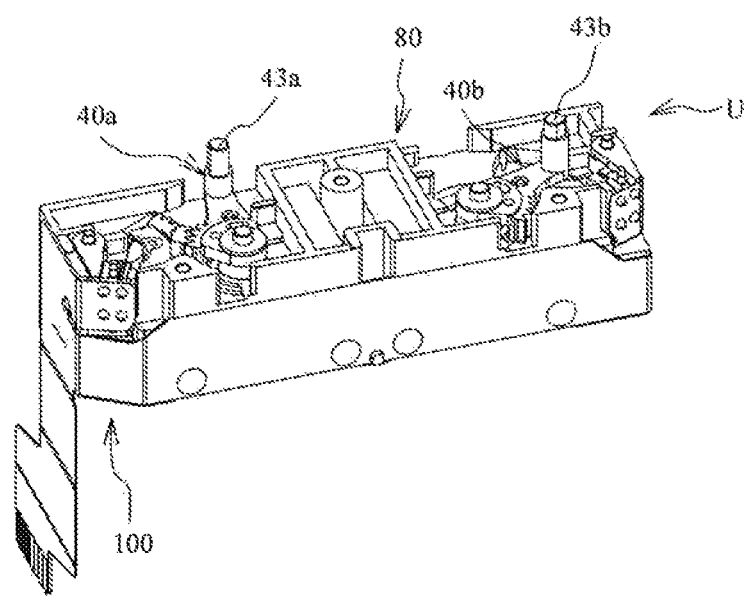
FIG. 9 is an explanatory view of a unit.

FIG. 9 is an explanatory view of a unit U. The unit U includes the holders 80 and 90, and the actuators 70*a* and 70*b*. In such a way, the two actuators 70*a* and 70*b* are attached to the holders 80 and 90 to be assembled into the single unit U, handled, and managed. In this manner, the unit U integrated with the holders 80 and 90 is attached to the board 10 or the like, so the blade drive device 1 is accomplished. Thus, the unit U can be tested for operation before being attached to the board 10 or the like. For example, in a case where the actuator 70*a* or the like is found defective in the operation test after the blade drive device 1 is accomplished, the defective actuator 70*a* or the like has to be replaced. Alternately, the blade drive device 1 equipped with normal parts has to be abolished. However, in the present embodiment, the actuators 70*a* and 70*b* are handled as the unit U, so the operation test of the unit U can be performed before being attached to the board 10. It is therefore possible to prevent the influence on the driving properties of the rotors 72*a* and 72*b*, and it is possible to avoid replacing defective parts and to avoid wasting normal parts. This suppresses an increase in manufacturing cost.

Figure 10A:
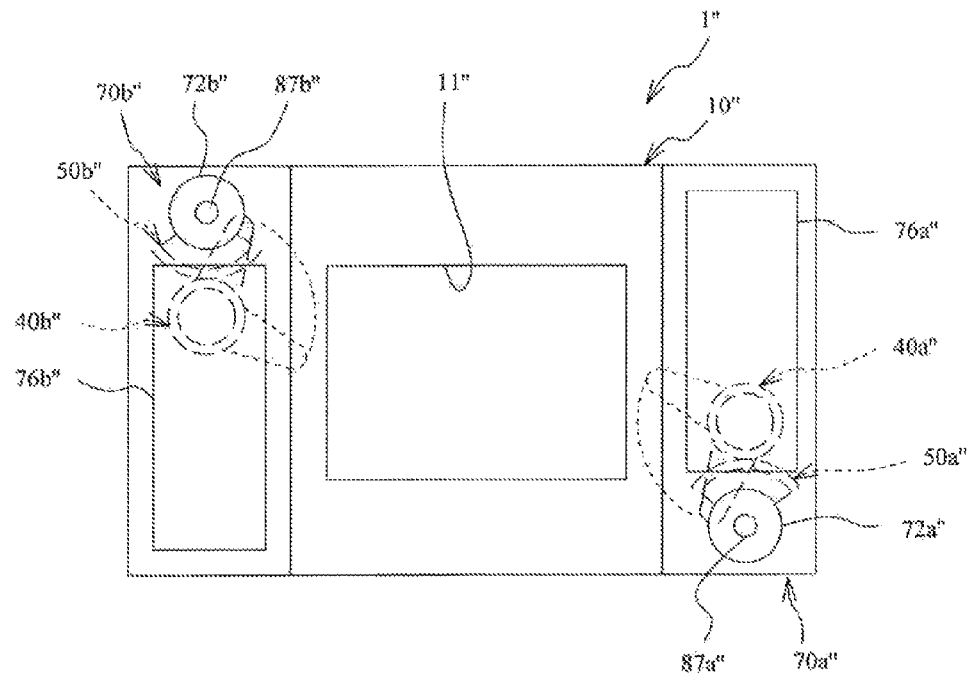
FIGS. 10A and 10B are front views of blade drive devices according to variations.

FIG. 10A is an explanatory view of a blade drive device 1" according to a variation. Additionally, similar components will be denoted by the similar reference numerals, and a detailed description of such components will be omitted. Further, parts are omitted in FIG. 10A. As illustrated in FIG. 10A, actuators 70*a*" and 70*b*" are arranged away from each other to sandwich the opening 11. Also in this case, the rotational ranges of drive members 40*a*" and 40*b*' are set not to overlap spindle portions 87*a*" and 87*b*". Thus, rotors 72*a*" and 72*b*" can be supported in a stable manner.

Figure 10B:
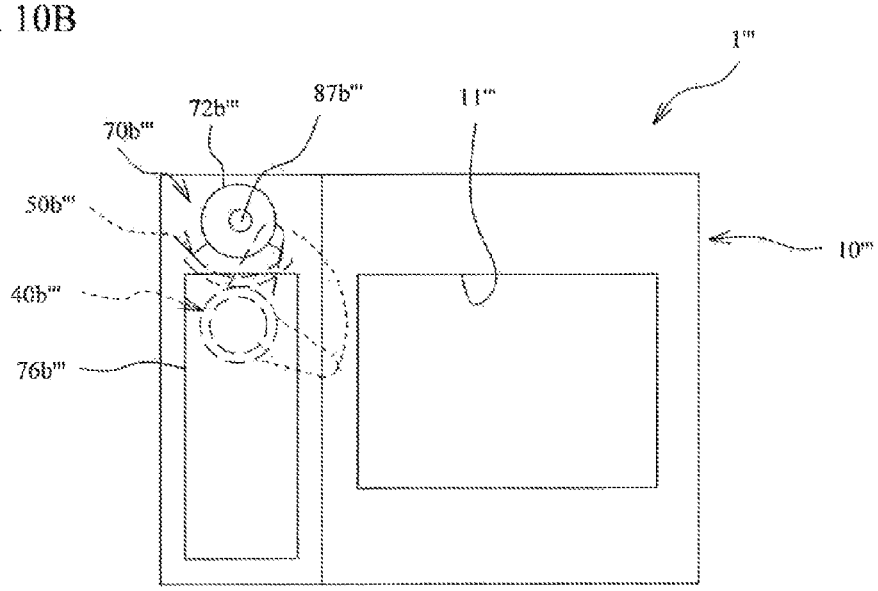

FIG. 10B is an explanatory view of a blade drive device 1'" according to a variation. Additionally, similar components will be denoted by the similar reference numerals, and a detailed description of such components will be omitted. Further, parts are omitted in FIG. 10B. The blade drive device 1'" is provided with a single actuator 70*b*'", but not the leading blade 20A or the actuator 70*a*. The blade drive device 1'" is mounted on a camera in which an electronic leading blade can artificially move. As sequentially resetting charges stored in an image pickup element for every pixel line in a predetermined direction, the electronic leading blade artificially moves. Also in this case, the rotational range of a drive member 40*b*'" is set not to overlap a spindle portion 87*b*'", thereby supporting a rotor 72*b*'" in a stable manner.

Figure 11:
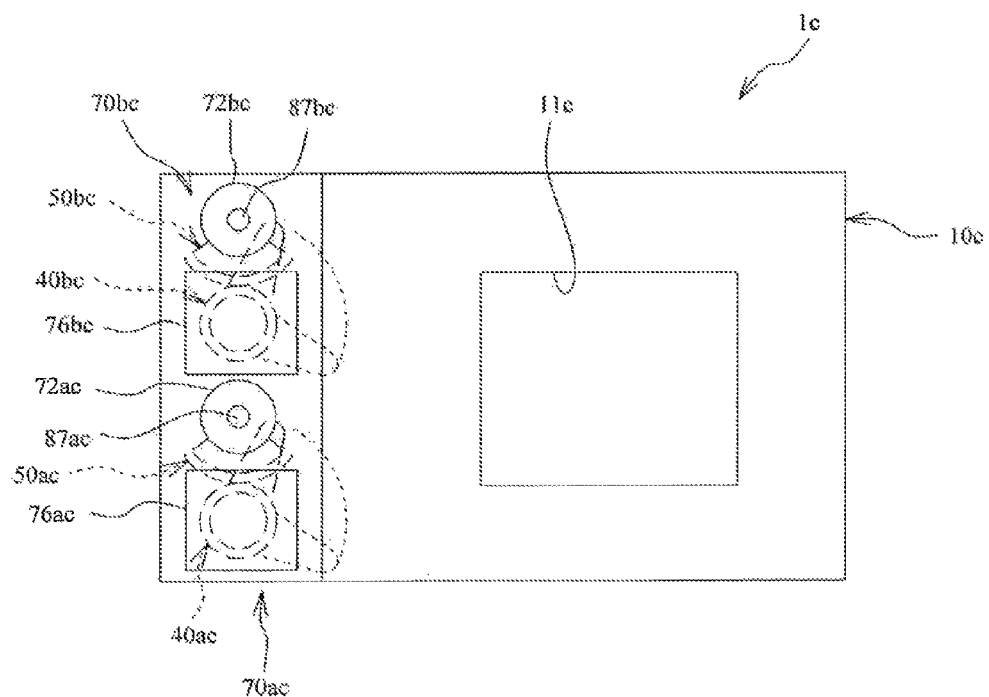
FIG. 11 is a front view of a blade drive device according to a variation.

FIG. 11 is an explanatory view of a blade drive device 1*c* according to a variation. Additionally, similar components will be denoted by the similar reference numerals, and a detailed description of such components will be omitted. Further, parts are omitted in FIG. 11. Adjacent actuators 70*ac* and 70*bc* are arranged to face the same side. In other words, only a coil 76*bc* is arranged to be sandwiched between rotors 72*ac* and 72*bc*, the rotor 72*bc* is arranged at the end of the whole region of the actuators 70*ac* and 70*bc*, and the coil 76*ac* is arranged at the other end thereof. Also in this case, the rotational ranges of drive members 40*ac* and 40*bc* are set not to overlap spindle portions 87*ac* and 87*bc*. Thus, rotors 72*ac* and 72*bc* can be supported in a stable manner.

Further, even in the above case where the rotors 72*ac* and 72*bc* only sandwich the coil 76*bc*, the rotors 72*ac* and 72*bc* are prevented from magnetically influencing each other and are prevented from influencing the driving properties of the rotors 72*ac* and 72*bc*. Even in a case where the rotors 72*ac* and 72*bc* only sandwich the coil 76*ac*, the same effect is achieved. That is, the rotors 72*ac* and 72*bc* that are an example of first and second rotors have only to sandwich at least one of the coils 76*ac* and 76*bc* that are an example of first and second coils.

While the exemplary embodiments of the present invention have been illustrated in detail, the present invention is not limited to the above-mentioned embodiments, and other embodiments, variations and modifications may be made without departing from the scope of the present invention.

Finally, several aspects of the present invention are summarized as follows.

According to an aspect of the present invention, there is provided a blade drive device including: a board including an opening; first and second blades opening and closing the opening; and first and second actuators respectively driving the first and second blades, wherein the first and second actuators respectively include first and second stators, first and second rotors, and first and second coils, and respectively drive the first and second blades through first and second drive members, the first drive member is arranged to overlap the first stator and the first coil in an optical axis direction, and the second drive member is arranged to overlap the second stator and the second coil in the optical axis direction.

Since the first drive member is arranged to overlap the first stator and the first coil in an optical axis direction and the second drive member is arranged to overlap the second stator and the second coil in the optical axis direction, the blade drive device has a reduced size in a planar direction perpendicular to the optical axis direction.

According to another aspect of the present invention, there is provided an optical instrument having the above blade drive device.

What is claimed is:
1. A blade drive device, comprising:
a board including an opening;
first and second blades opening and closing the opening;
first and second actuators respectively driving the first and second blades,
wherein the first and second actuators respectively include first and second stators, first and second rotors, and first and second coils, and respectively drive the first and second blades through first and second drive members,
wherein the first drive member is arranged to overlap the first stator and the first coil in an optical axis direction, and
wherein the second drive member is arranged to overlap the second stator and the second coil in the optical axis direction; and
a first output member rotating together with the first rotor,
wherein the first drive member is engaged with the first output member and drives the first blade,
wherein at least part of the first output member and at least part of the first drive member overlap at least part of the first stator and the first coil in the optical axis direction,
wherein the first drive member is engaged with the first blade,
wherein a rotational axis of the first output member is identical to a rotational axis of the first rotor,
wherein a rotational axis of the first drive member is positioned away from the rotational axis of the first output member, and
wherein the rotational axis of the first drive member overlaps the first stator and the first coil in the optical axis direction and is positionally displaced from the rotational axis of the first rotor.

2. The blade drive device of claim 1, wherein an axis of the second drive member overlaps the second stator and the second coil and is positionally displaced from an axis of the second rotor.

3. The blade drive device of claim 1, wherein the first rotor is arranged not to overlap the first coil in the optical axis direction, and the second rotor is arranged not to overlap the second coil in the optical axis direction.

4. The blade drive device of claim 1, wherein the first and second rotors are arranged to sandwich the first and second coils.

5. The blade drive device of claim 1, wherein
the first and second actuators are arranged in a longitudinal direction of the first actuator and in a longitudinal direction of the second actuator, and
the first and second rotors are respectively arranged at both end portions in the longitudinal direction of a whole region of the first and second actuators.

6. The blade drive device of claim 1, wherein
the first output member includes a first output teeth portion, and
the first drive member includes a first following teeth portion meshing with the first output teeth portion.

7. The blade drive device of claim 1, wherein
the first output member is integrally formed with the first rotor.

8. The blade drive device of claim 1, further comprising a holder holding both the first and second actuators and attached to the board,
wherein the first and second actuators are unitized with the holder.

9. An optical instrument, comprising a blade drive device, the blade drive device, comprising:
a board including an opening;
first and second blades opening and closing the opening;
first and second actuators respectively driving the first and second blades,
wherein the first and second actuators respectively include first and second stators, first and second rotors, and first and second coils, and respectively drive the first and second blades through first and second drive members,
wherein the first drive member is arranged to overlap the first stator and the first coil in an optical axis direction, and
wherein the second drive member is arranged to overlap the second stator and the second coil in the optical axis direction; and
a first output member rotating together with the first rotor,
wherein the first drive member is engaged with the first output member and drives the first blade,
wherein at least part of the first output member and at least part of the first drive member overlap at least part of the first stator and the first coil in the optical axis direction, wherein the first drive member is engaged with the first blade, wherein a rotational axis of the first output member is identical to a rotational axis of the first rotor, wherein a rotational axis of the first drive member is positioned away from the rotational axis of the first output member, and wherein the rotational axis of the first drive member overlaps the first stator and the first coil in the optical axis direction and is positionally displaced from the rotational axis of the first rotor.

* * * * *